United States Patent Office 2,754,577
Patented July 17, 1956

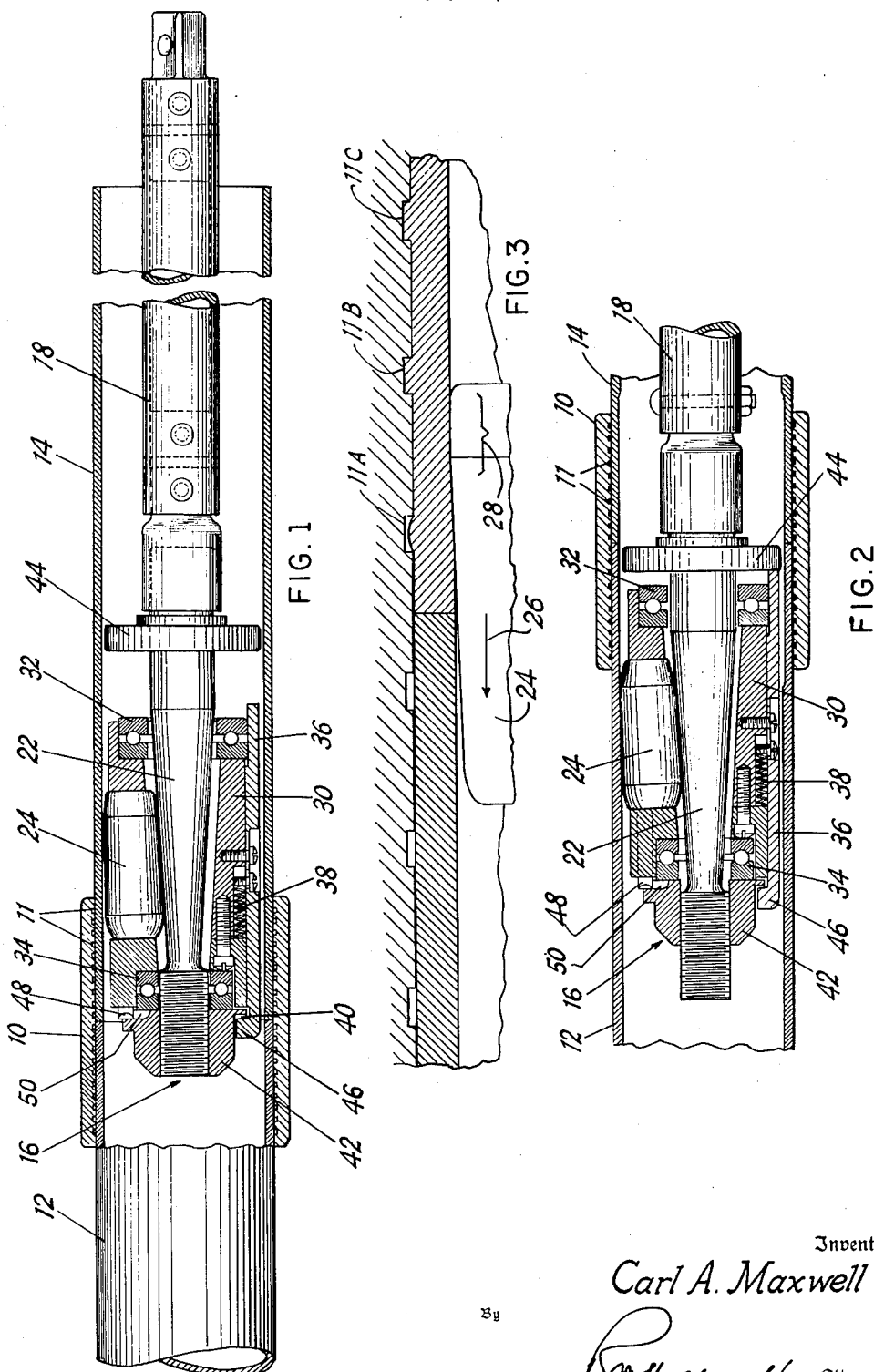

2,754,577

METHOD OF MAKING A PIPE LINE

Carl A. Maxwell, Akron, Ohio, assignor to The Babcock & Wilcox Company, Rockleigh, N. J., a corporation of New Jersey Application November 22, 1950, Serial No. 196,971

3 Claims. (Cl. 29—523)

This invention relates to a method of assembling and making a pipe line construction including a series of pipe sections arranged end to end for series flow of fluid therethrough, adjacent pipe sections being joined by an expanded joint connection including a tubular coupling surrounding the ends of the adjacent pipe sections within the coupling.

More specifically, the invention relates to such a pipe line construction in which the coupling has a plurality of circular grooves in its inner wall surface, the grooves receiving pipe metal which flows into the grooves as a result of the expanding of the tube ends within the coupling.

The invention also comprehends a method of forming a pipe line construction in which the juxtaposed ends of adjacent pipe or tube sections fitted within a tubular coupling surrounding those pipe ends are expanded within the coupling from a position at the end of one of the pipe sections remote from its coupling end.

In a more specific sense, the invention involves a method of forming a pipe line in which a series of long pipe sections (i. e. 30–200 diameters long) are joined in the above indicated manner while the pipe sections are held against rotation and then continuing the extension of the pipe line by acts similar to those above specified, the expanding operation being always controlled and effected from the free end of the last positioned and unattached pipe section having its following end aligned with the end of the adjacent pipe section, and with the two adjacent ends disposed within a telescoping coupling.

The invention will be described below with reference to the accompanying drawings in which a preferred embodiment of the invention is illustrated.

In the drawings:

Fig. 1 is mainly a horizontal section through a portion of a pipe line and an expander in a position wherein it is about to begin its operation to secure the abutting ends of adjacent tubes within a grooved coupling;

Fig. 2 is a horizontal section similar to Fig. 1 and showing the expander in a position immediately after completion of its operation in securing adjacent tube ends to the coupling, and Fig. 3 is a partial longitudinal section of a coupling showing a part of one tube end expanded and the adjacent tube end unexpanded.

The drawing shows a pipe line coupling 10 having transverse axially spaced circumferential grooves 11 formed in its inner wall surface. In the construction of a pipe line of steel, these couplings are of similar material and the length of the coupling is preferably about 1½ times the diameter of the pipe or tube sections. The grooves in the coupling inner wall surface are preferably ³⁄₁₆" wide and ¹⁄₃₂" deep.

The illustrative method of forming the pipe line involves the telescoping of the pipe joint coupling or sleeve 10 over the end of a pipe or pipe section 12, preferably so that the end of this pipe extends about half way through the coupling as shown in the drawings. The drawing is to be taken as showing the pipe section 12 as representative of a fixed pipe united to a previously completed section of a pipe line. After the coupling 10 is disposed as indicated, a similar pipe section 14 is disposed within the other end of the coupling and moved to a position adjacent to or in contact with the end of the pipe section 12.

The next step in the illustrative method of forming the pipe line is the insertion of a roller expander 16, in the pipe section 14, with a long operating rod 20 connected to the mandrel 22 of the expander by appropriate fastening means. This operating rod is considerably longer than the length of the pipe section 14 and it is preferably marked so as to facilitate the indexing of the expander whereby the operator can readily determine when the expander has reached such a position as that indicated in Fig. 1 of the drawings, and can also tell when the expander has finished expanding the tube ends within the coupling, and has reached such position as that indicated in Fig. 2 of the drawings.

When the expander has reached such a position as that indicated in Fig. 1, the operating rod 18 and the mandrel are rotated so as to cause the expander rollers such as 24 to move outwardly radially into tube expanding condition. After the rollers have reached this condition the expander is such that continued rotation of the mandrel does not further radially expand the rollers but rather causes the entire expander to advance through the pipe or tube ends within the coupling, expanding the tube metal into the grooves 11 as the expander moves along. After the expander has finished this tube expanding operation, it has reached a position similar to that shown in Fig. 2. Thereupon, the rotation of the operating rod and the mandrel 22 is reversed so as to bring the tube contacting rollers (such as 24) out of their tube expanding positions. In other words they are retracted radially so that the entire expander can be withdrawn from the free end of the tube section 14 and the entire series of steps repeated within the next pipe coupling.

The expander with its rollers is so formed that when the expander is operated in one direction it will be expanding the tube metal, at any one instant, over only a small fraction of the length of the coupling 10. For example, the most active part of the expander extends over no greater distance than the distance between successive grooves 11 within the coupling. Thus, in the above described operation, and considering the expander roller 24 as moving in the direction of the arrow 26 in Fig. 3, the most active part (or most instantaneously effective part, as to causing tube metal flow) of the roller in so far as the flow of tube metal is concerned is such a section as that indicated at 28. With this operation, the metal of the tube section 14 would be first expanded into the groove 11C, and then as the expander moves along to the left the tube metal will be expanded and caused to flow into the next groove 11B. Fig. 3 shows the next successive groove 11A only partially filled with tube metal, inasmuch as the most effective or active part of the expander roller 24 has not passed that position in the tube. The metal of the tube section 14 is first expanded at the position of the groove 11C and is locked to the coupling 10 at that position. Continued operation of the expander makes it progressively effective over successive areas of the tube metal along a helical path until the end portions of the adjoining tubes 12 and 14 are expanded into the coupling 10, and the metal of the tube ends has been caused to flow into all of the circumferential grooves 11.

The body 30 of the expander is of tubular form with appropriate recesses, usually three in number, for receiving the tube contacting rollers such as 24. At opposite ends of the body 30, are ball bearings such as 32 and 34 to receive the thrusts created during the operation of the expander and to promote its effective operation.

The body of the expander has a slide or sliding latch member 36 disposed within a recess extending longitudinally of the body. This slide 36 is biased by a spring 38 into locking engagement with a notch 40 formed in the nut 42 which is threaded upon the leading end of the mandrel 22. When this nut is thus held against rotation relative to the body of the expander, the rotation of the mandrel feeds the latter into the tube and moves the tube engaging rollers outwardly radially. The extent of this action is predetermined by the position of the stop collar 44 fixed to the opposite end of the mandrel. In practice, this stop collar is preset or adjusted (as by set screws) so as to give a predetermined number of turns of the mandrel before the collar 44 makes contact with the right hand end of the slide 36. Further rotation of the mandrel causes the stop collar to move the slide 36 and to release the latching end 46 of the latter from the nut 42. Thereupon, the nut may turn with the mandrel in the actual expanding operation. The increased friction at the position of threaded engagement of the nut and the mandrel causes this action.

At the end of the expanding operation (determined by the operator by proper indexing of the operation rod 18) the direction of the movement of the mandrel is reversed. The nut then moves with the mandrel until the spring pressed detent, or ratchet 48, slidably mounted on the body of the mandrel, falls into one of the recesses 50 formed into that part of the nut facing the ratchet. Thereupon, the nut is held against rotation with the mandrel and the continuation of the reverse rotation of the mandrel quickly releases the rollers (such as 24) from their operative contact with the tube metal. Thereupon, the mandrel is withdrawn through the pipe or tube length 14 and the entire operation is repeated at the position of the free end of the tube length 14.

The illustrative method is particularly advantageous in the fabrication of high pressure pipe lines made of high carbon or alloy steel for the conveyance of gasoline or other hydrocarbon fluids over long distances. Such pipe lines have been formed by the joining of the successive pipe lengths by welding, and the welding operation has required heavy and expensive equipment. Furthermore, such welding operations have involved the necessity of using heating equipment for preheating the pipe ends to be joined and for heat treating those portions of the pipe line after the welding operation. Such equipment has also been weighty and bulky, and has involved considerable expense in its transportation. In contrast, the tube expanding equipment for performing the illustrative method is neither bulky nor exceedingly heavy. It is also not difficult nor costly to transport it to the scene of operation and along the pipe line in the actual building of the same.

The pipe joints utilized in the practice of the present invention are not only cheaper than those which have been used in pipe lines, but the pipe line joints involving these couplings are more easily put together. These joints are also more satisfactory from the standpoints of strength and tightness. In a test of an 8" pipe line joint produced by the practice of this invention, the pull out force required to pull the pipe from the coupling member varied from 365,000 lb. to 513,000 lb., the latter value being the equivalent of about 10,000 p. s. i. on the end of the pipe.

While the invention has been described with reference to the particular apparatus or equipment shown in the drawings, it is to be appreciated that the invention is not limited to the details thereof. It is rather to be taken as of a scope commensurate with the scope of the subjoined claims.

I claim:

1. A method of fabricating a pipe line for the conveyance of fluid under pressure, the method consisting of the axial alignment of first and second standard pipe lengths in end-to-end relationship with the adjacent ends of the pipe lengths fitting within a unitary hollow cylindrical coupling, said alignment involving relative longitudinal sliding movement between a pipe length and the coupling, completing a pressure tight joint between the coupling and its enclosed pipe ends by incrementally expanding an enclosed pipe end by action initiated and controlled from a position beyond the end of the second pipe length remote from its coupling enclosed end, said expanding being continuous from beginning of the expanding operation to its completion, said incremental expanding being limited at any one instant as to its maximum metal flow action to an annular pipe metal zone of a width which is a small fraction of the length of the ultimate expanded joint, and repeating the above sequence of acts in successive pipe lengths along the pipe line.

2. Claim 1 further characterized by: the fixing of said first pipe length lengthwise of the pipe line before the second pipe length is added thereto, the starting of said tube expanding action at a position in the second pipe length and proceeding from that position toward the end of the pipe length nearest that position and then proceeding into the first pipe length.

3. Claim 1 further characterized by: the fixing of said first pipe length lengthwise of the pipe line before the second pipe length is added thereto, the bringing of the pipe lengths into end-to-end contact in said axial alignment, and starting said tube expanding action at a position in the second pipe length and proceeding from that position toward the end of said second pipe length nearest the starting position and then proceeding into the first pipe length from its contacting end.

References Cited in the file of this patent
UNITED STATES PATENTS

| Number | Name | Date |
|---|---|---|
| 310,264 | Emery | Jan. 6, 1885 |
| 332,035 | Bagaley | Dec. 8, 1885 |
| 1,987,608 | Dewald | Jan. 15, 1935 |
| 2,089,790 | Halpern | Aug. 10, 1937 |
| 2,134,311 | Minor | Oct. 25, 1938 |
| 2,160,263 | Fletcher | May 30, 1939 |
| 2,219,784 | Maupin | Oct. 29, 1940 |
| 2,252,274 | Rossheim | Aug. 12, 1941 |
| 2,284,260 | Castellanos | May 26, 1942 |
| 2,330,966 | Gottwold | Oct. 5, 1943 |
| 2,367,206 | Davis | Jan. 16, 1945 |
| 2,383,241 | Prout | Aug. 21, 1945 |
| 2,399,790 | Conroy | May 7, 1946 |
| 2,451,146 | Baker | Oct. 12, 1948 |